United States Patent
Kim et al.

(10) Patent No.: US 9,727,195 B2
(45) Date of Patent: Aug. 8, 2017

(54) TOUCH PANEL AND METHOD FOR FABRICATING THE SAME

(71) Applicant: LG Display Co., Ltd., Seoul (KR)

(72) Inventors: Seung-Hyun Kim, Goyang-si (KR); Hyung-Chul Kim, Goyang-si (KR); Tae-Yeon Yoo, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/971,798

(22) Filed: Dec. 16, 2015

(65) Prior Publication Data

US 2016/0103529 A1    Apr. 14, 2016

Related U.S. Application Data

(62) Division of application No. 13/308,282, filed on Nov. 30, 2011, now Pat. No. 9,262,018.

(30) Foreign Application Priority Data

Apr. 12, 2011 (KR) .......................... 10-2011-0033832

(51) Int. Cl.
  *G06F 3/044*    (2006.01)
  *H01B 13/00*    (2006.01)

(52) U.S. Cl.
  CPC .... *G06F 3/044* (2013.01); *G06F 2203/04103* (2013.01)

(58) Field of Classification Search
  None
  See application file for complete search history.

(56) References Cited

U.S. PATENT DOCUMENTS

| | | | |
|---|---|---|---|
| 6,255,130 B1* | 7/2001 | Kim | H01L 27/1214 438/158 |
| 2007/0197019 A1* | 8/2007 | Kang | G02F 1/13454 438/620 |
| 2009/0127519 A1 | 5/2009 | Abe et al. | |
| 2009/0244021 A1 | 10/2009 | Matsuo et al. | |
| 2010/0134429 A1* | 6/2010 | You | G06F 3/044 345/173 |

(Continued)

FOREIGN PATENT DOCUMENTS

| CN | 101546243 A | 9/2009 |
|---|---|---|
| KR | 10-2009-0058072 A | 6/2009 |

*Primary Examiner* — Shamim Ahmed
(74) *Attorney, Agent, or Firm* — Birch, Stewart, Kolasch & Birch, LLP

(57) ABSTRACT

A method for fabricating a touch panel includes forming a routing and pad pattern group on a substrate to include first and second routing lines, first pad electrodes connected to the first routing line, and second pad electrodes connected to the second routing line, by using a first mask, forming a sensor electrode pattern group on the substrate having the routing and pad pattern group formed thereon to include first sensor electrodes formed in a first direction, second sensor electrodes formed in a second direction, and connection portions that each connects adjacent first sensor electrodes, by using a second mask, forming a first insulating layer to include contact holes to expose portions of the second sensor electrodes, respectively, by using a third mask and forming bridges that each connects adjacent second sensor electrodes through the contact holes and a second insulating layer on the bridges, by using a fourth mask.

8 Claims, 19 Drawing Sheets

(56) References Cited

U.S. PATENT DOCUMENTS

| | | |
|---|---|---|
| 2011/0090170 A1 | 4/2011 | Lin et al. |
| 2011/0267308 A1* | 11/2011 | Park .................. G06F 3/044 |
| | | 345/174 |
| 2012/0075257 A1 | 3/2012 | Choi et al. |
| 2014/0139485 A1 | 5/2014 | Teramoto |

* cited by examiner

Routing portion | Sensor electrode portion | Pad portion

Routing portion | Sensor electrode portion | Pad portion

Routing portion     Sensor electrode portion     Pad portion

Routing portion | Sensor electrode portion | Pad portion

Routing portion | Sensor electrode portion | Pad portion

Routing portion | Sensor electrode portion | Pad portion

Routing portion | Sensor electrode portion | Pad portion

Routing portion | Sensor electrode portion | Pad portion

TOUCH PANEL AND METHOD FOR FABRICATING THE SAME

CROSS REFERENCE TO RELATED APPLICATIONS

This application is a Divisional of U.S. application Ser. No. 13/308,282, filed on Nov. 30, 2011, now U.S. Pat. No. 9,262,018, which claims priority to and the benefit of Korean Patent Application No. 10-2011-0033832, filed in the Republic of Korea on Apr. 12, 2011. The contents of all of these applications are hereby incorporated by reference as fully set forth herein in their entirety.

BACKGROUND OF THE INVENTION

Field of the Invention

Embodiments of the invention relate to a touch panel, a display device with the touch panel, and a method for fabricating the touch panel, and more particularly to a touch panel and a method for fabricating the same which can reduce a number of fabrication steps.

Description of the Related Art

There are various kinds of display devices which display images, such as cathode ray tubes (CRT), liquid crystal display devices (LCD), plasma display panel devices (PDP), electro luminescence display devices (ELD), and organic luminescence display devices.

The liquid crystal display device controls light transmissivity of liquid crystals by using an electric field to display a picture. For this, the liquid crystal display device is provided with a liquid crystal panel having liquid crystal cells, a backlight unit for directing a light to the liquid crystal panel, and a driving circuit unit for driving the backlight unit and the liquid crystal cells.

There has been a rapid increase of demands on a display device which is used as an input device by mounting a touch panel thereto, in which a surface of a liquid crystal panel is pressed down with a pointer (a user's finger) to input information pertinent to the pointed position. Depending on touch sensing types, in the touch panels, there are a resistance type, a capacitive type, and an infrared ray sensing type, and, recently, the capacitive type has garnered attention in view of convenience of fabrication, sensing capability, and so on.

The touch panel is provided with a sensor glass having electrodes formed thereon for sensing the touch by a capacitive system, and a cover glass arranged to face a sensor substrate. In this instance, the sensor glass is provided with a routing portion having first sensor electrodes for sensing X-axis direction capacitance, bridges each for connecting adjacent first sensor electrodes through a contact hole, second sensor electrodes for sensing Y-axis direction capacitance, connection portions each for connecting adjacent second sensor electrodes, a first routing line for supplying a signal to the first sensor electrodes and a second routing line for supplying a signal to the second sensor electrodes, and a pad portion for supplying a signal to the first and second routing lines.

A method for fabricating the touch panel requires at least five mask steps. That is, the method requires many steps including formation of metal pads and the first and second routing lines on the sensor glass with a first mask→formation of the bridges with a second mask→formation of an insulating layer and formation of a contact hole with a third mask→formation of the first and second sensor electrodes with a fourth mask→formation of an insulating layer on the first and second sensor electrodes and removing the insulating layer from a region falling under the pad region with a fifth mask, thereby increasing fabrication cost and time.

SUMMARY OF THE INVENTION

Accordingly, the invention is directed to a touch panel and a method for fabricating the same.

An object of the invention is to provide a touch panel and a method for fabricating the same, which can reduce a number of fabrication steps and cost. Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a touch panel includes, a plurality of first sensor electrodes on a substrate and formed in a first direction for sensing a position in the first direction; a plurality of connection portions on the substrate, each connection portion connecting adjacent first sensor electrodes in the first direction; a plurality of second sensor electrodes on the substrate and formed in a second direction to cross the first direction for sensing a position in the second direction; a first insulating layer on the substrate having the first and second sensor electrodes and the connection portions formed thereon, the first insulating layer having contact holes exposing portions of the second sensor electrodes; and a plurality of bridges on the first insulating layer to connect adjacent second sensor electrodes in the second direction through the contact holes; and a second insulating layer formed on the bridges to have a pattern the same with the bridges.

In another aspect of the invention, a method for fabricating a touch panel includes forming a routing and pad pattern group on a substrate to include first and second routing lines, first pad electrodes connected to the first routing line, and second pad electrodes connected to the second routing line, by using a first mask; forming a sensor electrode pattern group on the substrate having the routing and pad pattern group formed thereon to include first sensor electrodes formed in a first direction, second sensor electrodes formed in a second direction, and connection portions that each connects adjacent first sensor electrodes, by using a second mask; forming a first insulating layer to include contact holes to expose portions of the second sensor electrodes, respectively, by using a third mask; and forming bridges that each connects adjacent second sensor electrodes through the contact holes and a second insulating layer on the bridges, by using a fourth mask.

It is to be understood that both the foregoing general description and the following detailed description of the invention are by example and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE EMBODIMENTS

Reference will now be made in detail to the embodiments of the invention, examples of which are illustrated in the accompanying drawings. Wherever possible, the same reference numbers will be used throughout the drawings to refer to the same or like parts. Before starting on the detailed description of the invention, it is noted that a detailed description of known arts will be omitted if the known arts can obscure the invention.

Preferred embodiments of the invention will be described with reference to FIGS. 1 to 15D.

Figure 1:
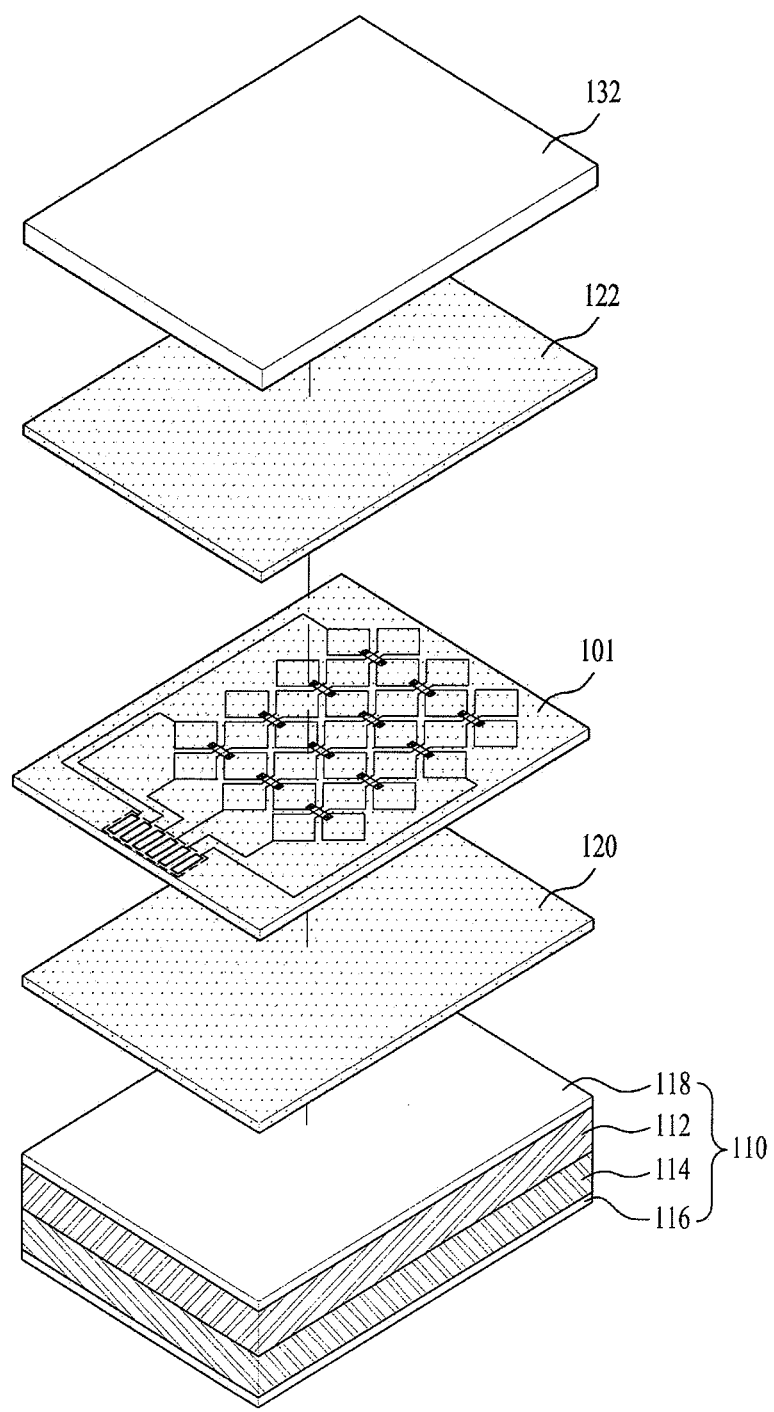
FIG. 1 illustrates an exploded perspective view of a display device with an embedded touch panel in accordance with an example embodiment of the invention.
Figure 2:
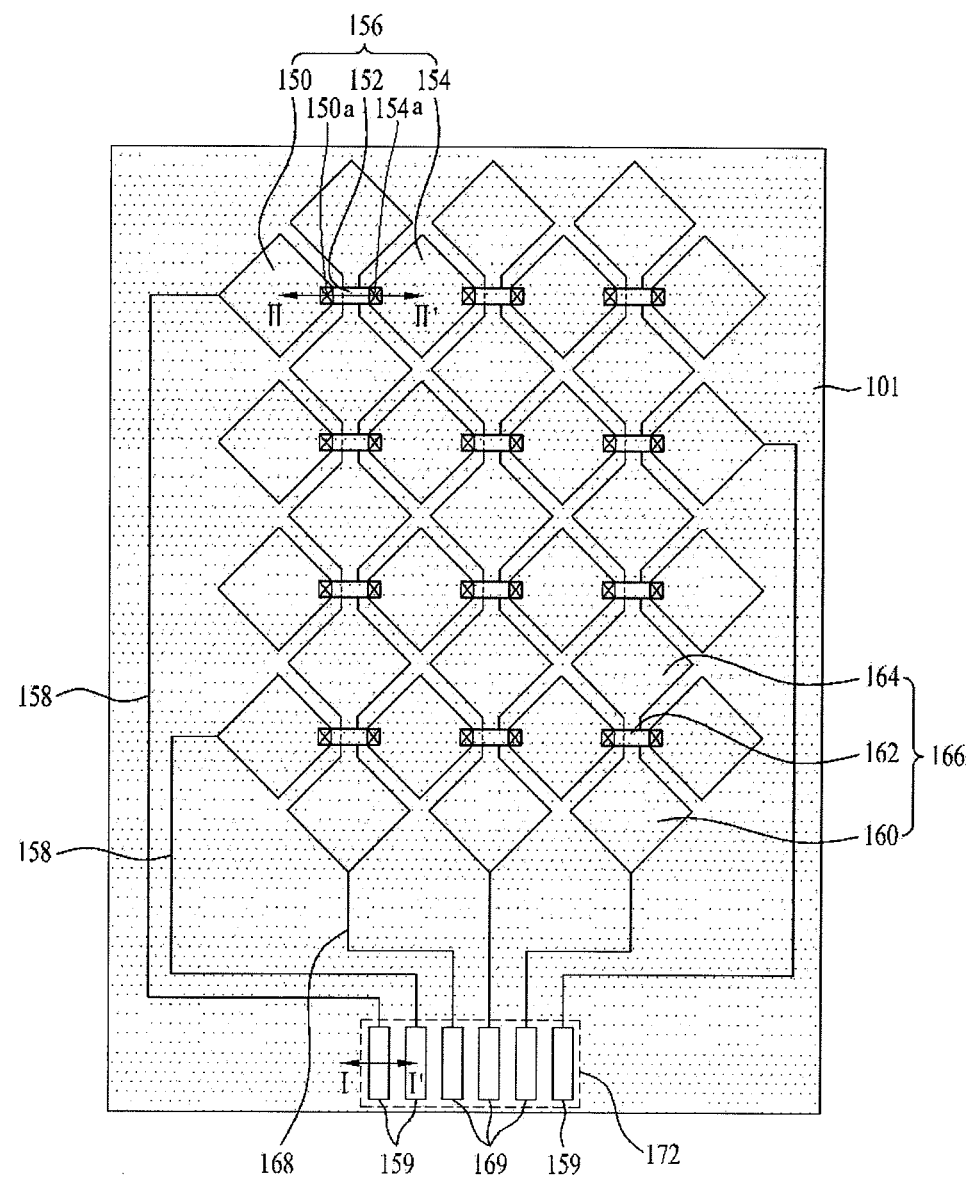
FIG. 2 illustrates a plan view of the touch panel in FIG. 1.
Figure 3:
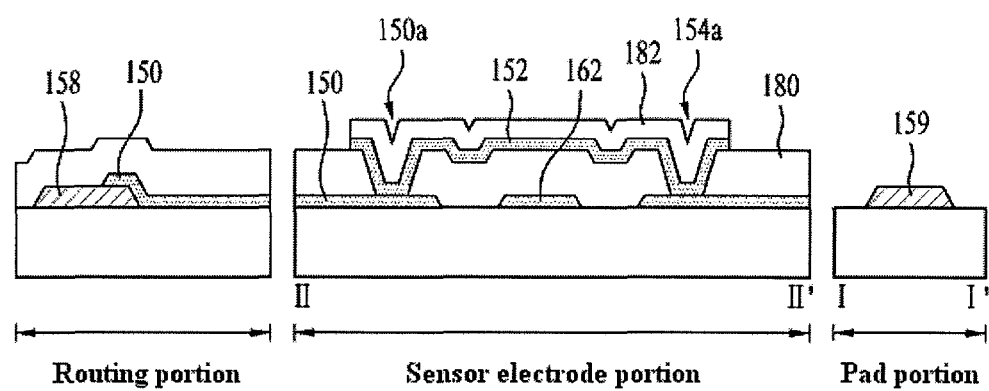
FIG. 3 illustrates a section across lines I-I' and II-II' of the touch panel in FIG. 2.

FIG. 1 illustrates an exploded perspective view of a display device with an embedded touch panel in accordance with an example embodiment of the invention, FIG. 2 illustrates a plan view of the touch panel in FIG. 1, and FIG. 3 illustrates a section across lines I-I' and II-II' of the touch panel in FIG. 2.

Referring to FIG. 1, the display device with an embedded touch panel includes a liquid crystal panel 110 and a touch panel mounted on the liquid crystal panel 110. Besides the liquid crystal panel 110, other flat display devices are applicable to the display device with an embedded touch panel in accordance with example embodiments of the invention, also.

The liquid crystal panel 110 includes an upper substrate 112, a lower substrate 114, an upper polarizing plate 118 attached to a front of the upper substrate 112, and a lower polarizing plate 116 attached to the lower substrate 114. The lower substrate 114 has thin film transistors formed thereon each connected to a gate line and a data line, and a pixel electrode connected to the thin film transistor. The upper substrate 112 has a color filter for producing colors, and a common electrode.

The color filter is formed on the upper substrate 112 such that a black matrix partitions colors. The color filter has R, G, B color filters to produce red, green and blue colors, respectively.

The common electrode of a transparent conductive film formed on a back side of the upper substrate 112 can form a vertical electric field with the pixel electrode. Also, a common electrode of a transparent conductive film formed on a lower substrate 114 can form a horizontal electric field with the pixel electrode. The common electrode has a reference voltage, i.e., a common voltage, supplied thereto for driving the liquid crystals.

The thin film transistor is formed on the lower substrate 114 for selective supply of a data signal from the data line to the pixel electrode in response to a gate signal from the gate line. For this, the thin film transistor has a gate electrode connected to the gate line, a source electrode connected to the data line, a drain electrode connected to the pixel electrode, an active layer overlapped with the gate electrode with a gate insulating film disposed therebetween to form a channel between the source electrode and the drain electrode, and an ohmic contact layer for making the active layer to cause ohmic contact to the source electrode and the drain electrode.

The pixel electrode is formed independently to overlap with each of the color filters R, G, B at the pixel regions and connected to the drain electrode of the thin film transistor. The pixel electrode is overlapped with the common electrode with the liquid crystal layer disposed therebetween to form the vertical electric field, or formed on the same substrate to form the horizontal electric field. Upon reception of the data signal, the pixel electrode forms the vertical electric field or the horizontal electric field with the common electrode having the common voltage applied thereto, to cause the liquid crystal molecules oriented in a vertical direction to rotate owing to the dielectric anisotropy. Variation of light transmissivity on the light passing through the pixel region with an extent of rotation of the liquid crystal molecules produces gradients of light.

Thus, the liquid crystal panel 110 may use, but not limited to, a TN (Twisted-Nematic) mode in which an electrode is provided to each of the substrates, whereby the liquid crystals are arranged such that a director thereof is twisted at 90°, and a voltage is applied to the electrodes to drive the director; an IPS (In-Plane Switching) mode in which the director of the liquid crystals are controlled with a horizontal electric field formed by two electrodes on one substrate; or an FFS (Fringe Field Switching) mode in which liquid crystal molecules are made to move by a fringe field formed between two electrodes of a transparent conductive material with a small gap therebetween.

The upper polarizing plate 118 is formed on an upper side of the upper substrate 112 of the liquid crystal panel 110. The upper polarizing plate 118 controls a transmitting light quantity and a polarizing state of the light incident thereon from the liquid crystal panel 110.

The lower polarizing plate 116 is formed on the back side of the lower substrate 114 of the liquid crystal panel 110. The lower polarizing plate 116 controls the transmitting light quantity and the polarizing state of the light incident thereon from the backlight unit.

The touch panel includes a sensor substrate 101 having first and second sensor electrode pattern portions 166, and 156 formed thereon to function as position sensing electrodes, a cover substrate 132 formed to face the sensor substrate 101, a first adhesive layer 120 formed on the upper polarizing plate 118 of the liquid crystal panel 110, and a second adhesive layer 122 formed on the sensor substrate 101. The adhesive layers may be formed of a transparent adhesive material having good light transmissivity, for an example, SVR (Super View Resin) or OCA (Optical Cleared Adhesive) film. The sensor substrate 101 and the cover substrate 132 may be formed of transparent glass. There may be a bottom insulating layer formed on a back side of the sensor substrate 101.

Referring to FIGS. 2 and 3, the sensor substrate 101 includes a first sensor electrode pattern portion 166, a second sensor electrode pattern portion 156, a routing portion 158 and 168, and a pad portion 172.

A plurality of first sensor electrode pattern portions 166 are formed in a first direction for sensing a change of a first direction capacitance. In this instance, the first direction may be, for an example, a Y-axis direction. Each first sensor electrode pattern portion 166 includes diamond shaped first sensor electrodes 160 and 164 and connection portions 162 formed of the same material with the first sensor electrodes 160 and 164 and on a layer the same with the first sensor electrodes 160 and 164 in the first direction for connecting adjacent first sensor electrodes 160 and 164, together.

The connection portions 162 and the first sensor electrodes 160 and 164 may be formed of a transparent material on the substrate 101. The transparent material may be indium tin oxide ITO, indium zinc oxide IZO, indium tin zinc oxide ITZO, or antimony tin oxide ATO. Other materials may be used.

A plurality of second sensor electrode pattern portions 156 are formed in a second direction for sensing a change of a second direction capacitance. In this instance, the second direction may be, for an example, an X-axis direction. Each second sensor electrode pattern portion 156 includes diamond shaped second sensor electrodes 150 and 154 and bridges 152 each for connecting adjacent the second sensor electrodes 150 and 154 in the second direction. Each of the bridges 152 connects adjacent second sensor electrodes 150 and 154 exposed through contact holes 150a and 154a. The second sensor electrodes 150 and 154 are electrically connected to the first routing line 158 to have a signal supplied thereto. Accordingly, the signal supplied through the first pad electrodes 159 is supplied to the second sensor electrodes 150 and 154 connected to the first routing line 158, and adjacent second sensor electrodes 150 and 154 have the signal supplied thereto through the bridge 152.

The second sensor electrodes 150 and 154 are formed of a transparent material on the substrate 101. The transparent material may be indium tin oxide ITO, indium zinc oxide IZO, indium tin zinc oxide ITZO, or antimony tin oxide ATO. Thus, since the bridge 152 formed of the transparent material has a visual advantage as the bridge 152 is invisible to user's eyes. That is, though the related art bridge of aluminum, copper, or molybdenum of non-transparent material is visible to the user's eyes depending on an angle of view to have a visual drawback, the bridge of the transparent material of the invention is invisible to the user's eyes to improve a display quality. Moreover, the bridge 152 of the invention has a second insulating layer 182 formed on the bridge 152, preventing the bridge 152 from being exposed to an outside, to prevent the bridge 152 from scratches and static electricity.

The routing portion 158 or 168 includes a first routing line 158 electrically connected to the second sensor electrodes 150 for receiving/transmitting a signal, and a second routing line 168 electrically connected to the first sensor electrodes 160 for receiving/transmitting a signal. As shown in FIG. 3, there is a first insulating layer 180 formed on the first routing line 158 and the second routing line 168. Each of the first routing line 158 and the second routing line 168 may be a stack of at least one of metals having low resistance selected from a group of metals including Al, Cu, Ag, Cr, Mo, AlNd, and MoTi. Since there is the first insulating layer 180 formed on the first and second routing lines 158 and 168, preventing the first and second routing lines 158 and 168 from being in contact with an outside, oxidation thereof may be prevented.

The pad portion 172 has first pad electrodes 159 connected to the first routing line 158, and second pad electrodes 169 connected to the second routing line 168. The first and second pad electrodes 159 and 169 are connected to FPC (Flexible Printed Circuit). According to this, the first pad electrodes 159 supply a touch control signal received through the FPC to the first routing line 158, and the second pad electrodes 169 supply a touch control signal received through the FPC to the second routing line 168.

FIGS. 4A to 7B illustrate plan views and sectional views showing the steps of a method for fabricating a touch panel in accordance with an example embodiment of the invention.

Figure 4A:
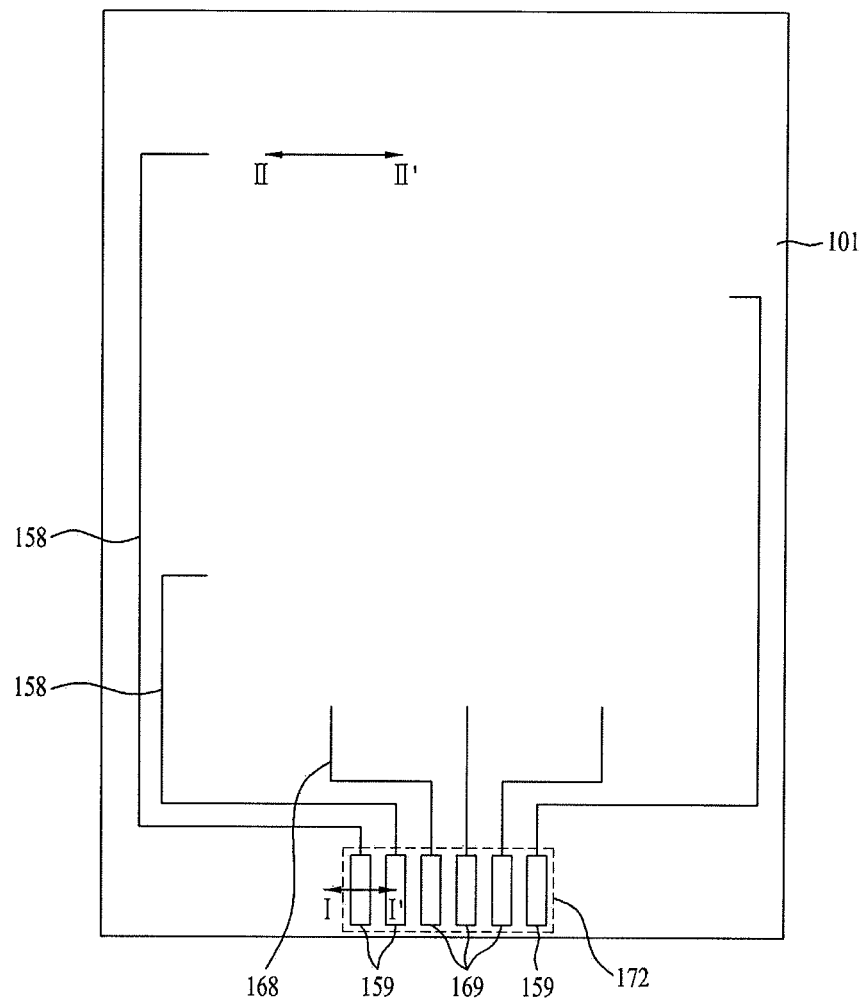
FIGS. 4A and 4B illustrate a plan view and a sectional view for describing a first mask step in a method for fabricating a touch panel in accordance with an example embodiment of the invention, respectively.
Figure 4B:
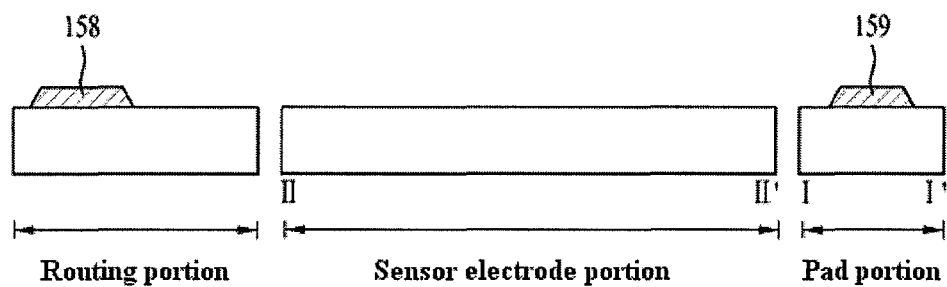

Referring to FIGS. 4A and 4B, a routing and pad pattern group is formed on a sensor substrate 101 to include first and second routing lines 158 and 168, and first and second pad electrodes 159 and 169 connected thereto, respectively.

In detail, a first conductive layer is formed on the sensor substrate 101 by deposition, such as sputtering. The first conductive layer is formed of metal such as Mo, Cu, Al, Cr, and Ag. Then, the first conductive layer is subjected to patterning by photolithography and etching with a first mask to form the routing and pad pattern group to include the first and second routing lines 158 and 168, and first and second pad electrodes 159 connected to the first routing line 158, and the second pad electrode 169 connected to the second routing line 168.

Figure 5A:
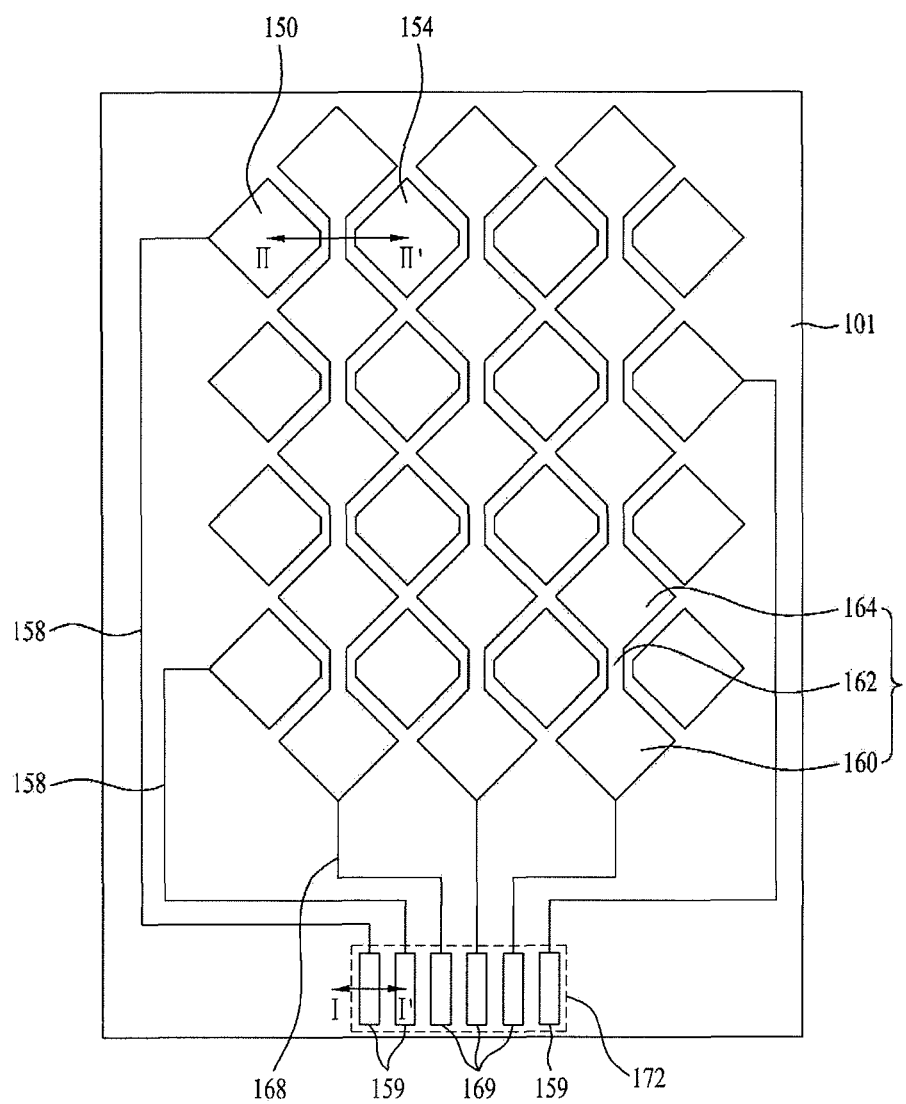
FIGS. 5A and 5B illustrate a plan view and a sectional view for describing a second mask step in a method for fabricating a touch panel in accordance with an example embodiment of the invention, respectively.
Figure 5B:
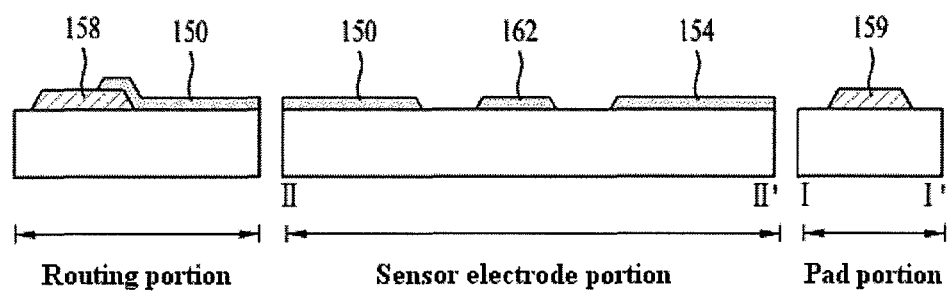

Referring to FIGS. 5A and 5B, a sensor electrode pattern group is formed on the sensor substrate 101 having the routing and pad pattern group. The sensor electrode pattern group includes the first and second sensor electrodes 160, 164 and 150, 154 and connection portions 162 each of which connects adjacent first sensor electrodes 160 and 164, together.

In detail, a second conductive layer is formed on the sensor substrate 101 by deposition, such as sputtering. The second conductive layer is formed of a transparent material, such as tin oxide (TO), indium tin oxide (ITO), indium zinc oxide (IZO), indium tin zinc oxide (ITZO), or antimony tin oxide (ATO). Then, the second conductive layer is subjected to patterning by photolithography and etching with a second mask to form the sensor electrode pattern group to include the first sensor electrodes 160 and 164 formed in a first direction, connection portions 162 each connects adjacent first sensor electrodes 160 and 164, and the first sensor electrodes 150 and 154 formed in a second direction, In this instance, as shown in FIGS. 5A and 5B, the second sensor electrodes 150 and 154 are connected to the first routing line 158, and the first sensor electrodes 160 and 164 are connected to the second routing line 168.

Figure 6A:
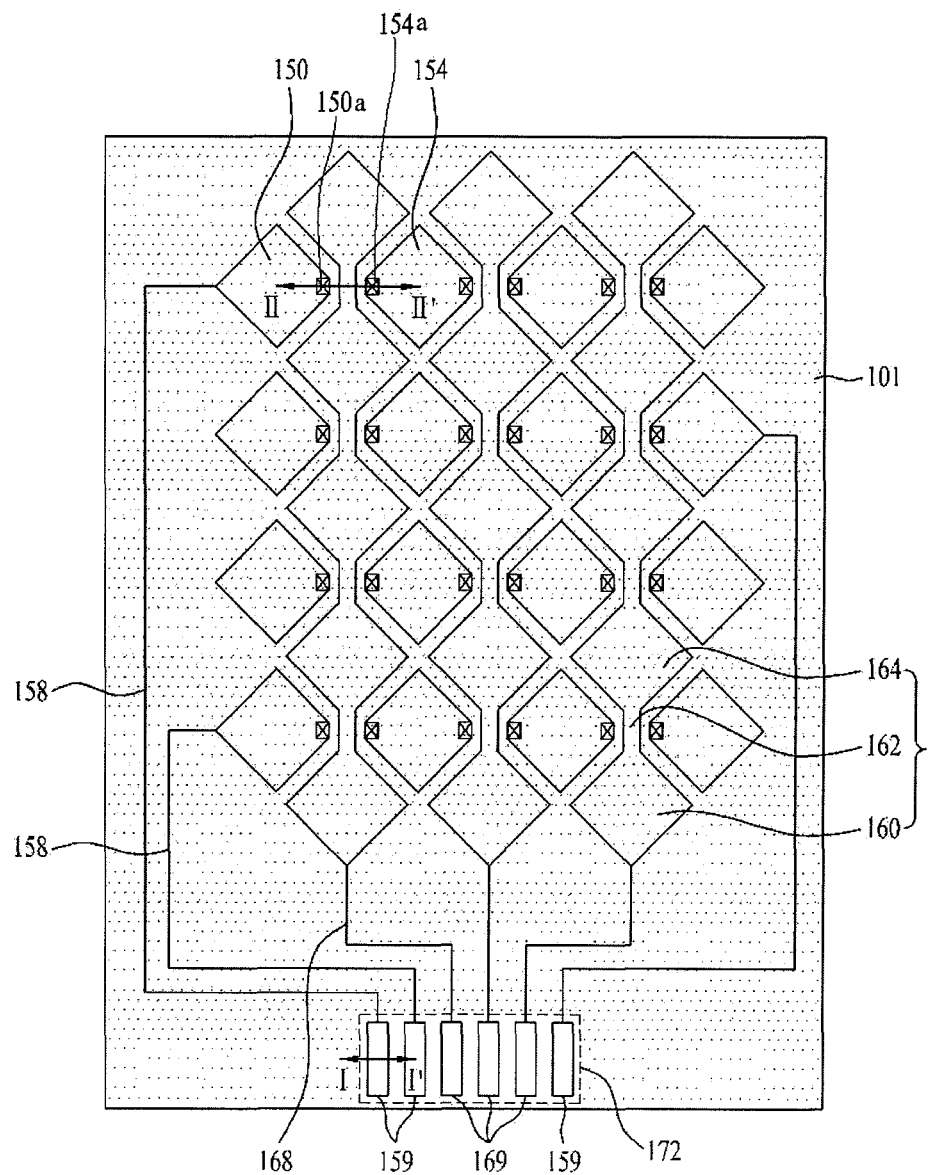
FIGS. 6A and 6B illustrate a plan view and a sectional view for describing a third mask step in a method for fabricating a touch panel in accordance with an example embodiment of the invention, respectively.
Figure 6B:
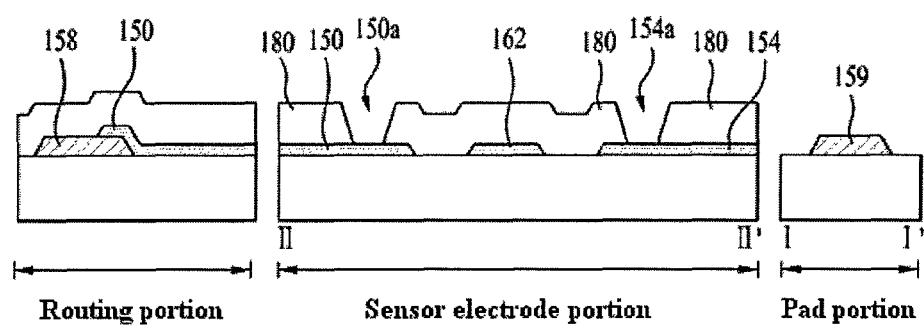

Referring to FIGS. 6A and 6B, a first insulating layer 180 is formed on the sensor substrate 101 having the sensor electrode pattern group formed thereon to include contact holes 150a and 154a, and the first insulating layer 180 is removed to open a pad portion region having the first and second pad electrodes 159 and 169 formed thereon.

In detail, inorganic insulating material, such as SiO$_2$, is coated on an entire surface of the sensor substrate 101, and the first insulating layer 180 is formed by photolithography and wet etching with a third mask to include contact holes 150a and 154a which expose the first sensor electrodes 150 and 154, respectively. In this instance, the first insulating layer 180 is removed from the pad portion region. The first insulating layer 180 remains on the first and second routing lines 158 and 168 formed at a routing region.

Figure 7A:
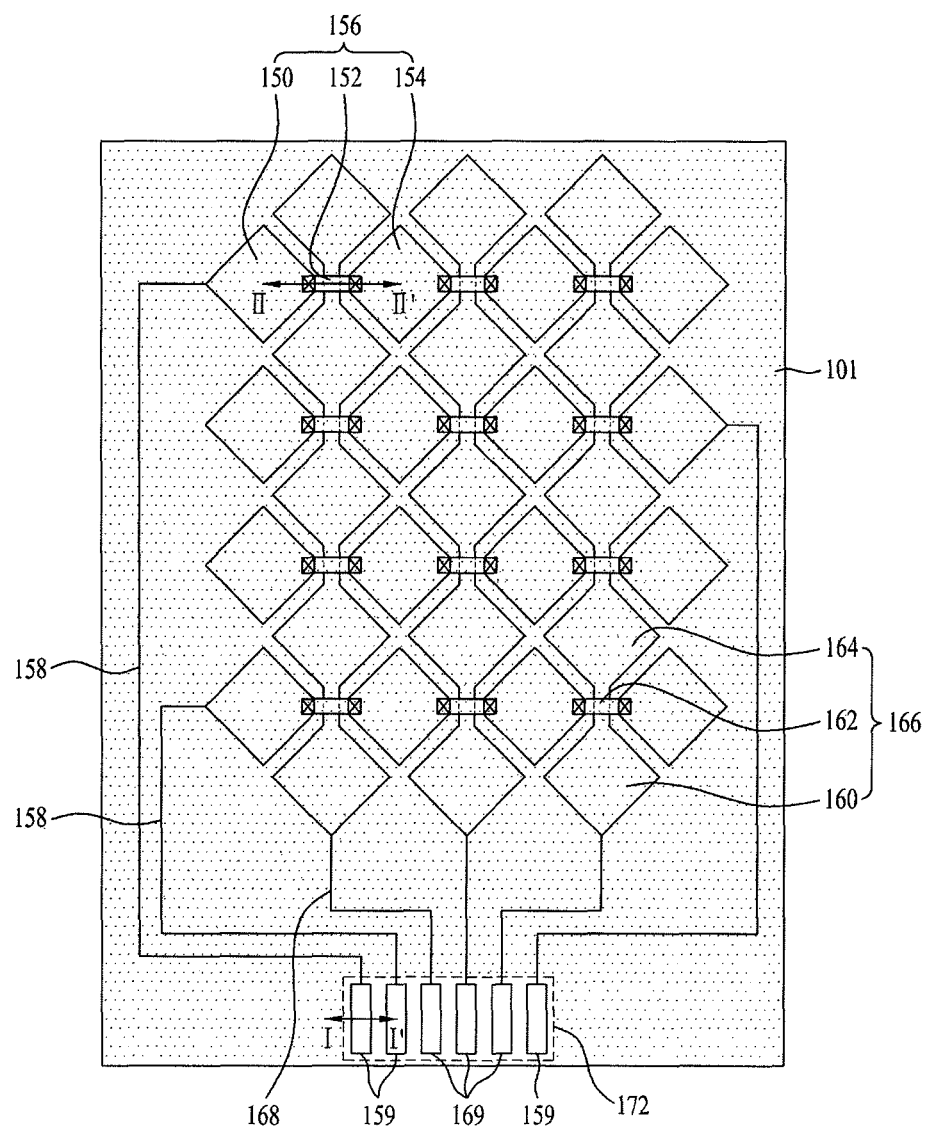
FIGS. 7A and 7B illustrate a plan view and a sectional view for describing a fourth mask step in a method for fabricating a touch panel in accordance with an example embodiment of the invention, respectively.
Figure 7B:
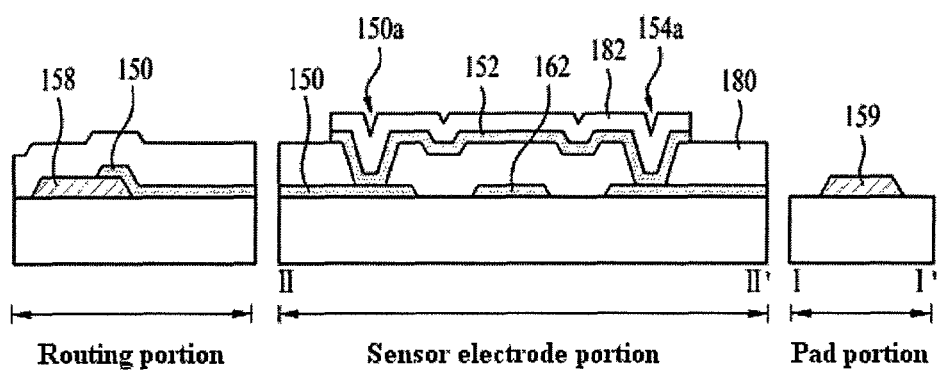

Referring to FIGS. 7A and 7B, bridges 152 and the second insulating layer 182 are formed on the sensor substrate 101 having the first insulating layer 180 formed thereon to include the contact holes 150a and 154a, and first and second pad electrodes 159 and 169 are formed at the pad portion region. This will be further described with reference to FIGS. 8A to 8D.

Figure 8A:
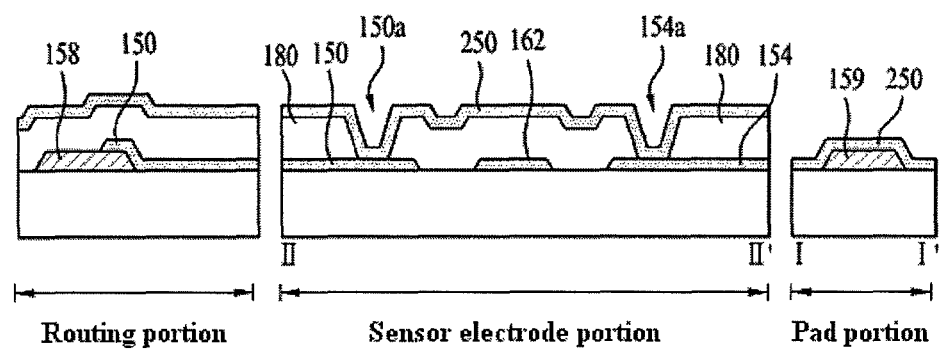
FIGS. 8A to 8D illustrate sectional views for describing the fourth mask step in FIGS. 7A and 7B, in detail.
Figure 8B:
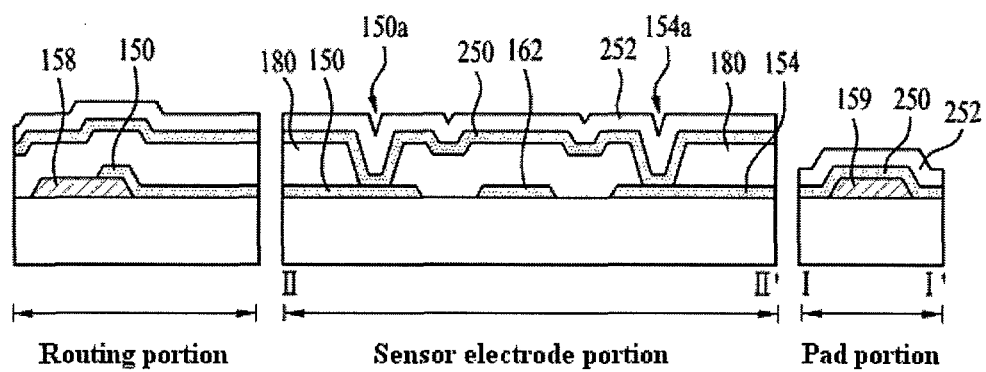

Referring to FIG. 8A, a third conductive layer 250 is formed on the sensor substrate having the first insulating layer 180 formed thereon by deposition, such as sputtering, and as shown in FIG. 8B, a second insulating layer 252 of an inorganic material, such as SiO$_2$, is coated on an entire surface of the third conductive layer 250. The third conductive layer 250 is formed of a transparent material, such as tin oxide (TO), indium tin oxide (ITO), indium zinc oxide (IZO), and indium tin zinc oxide (ITZO).

Figure 8C:
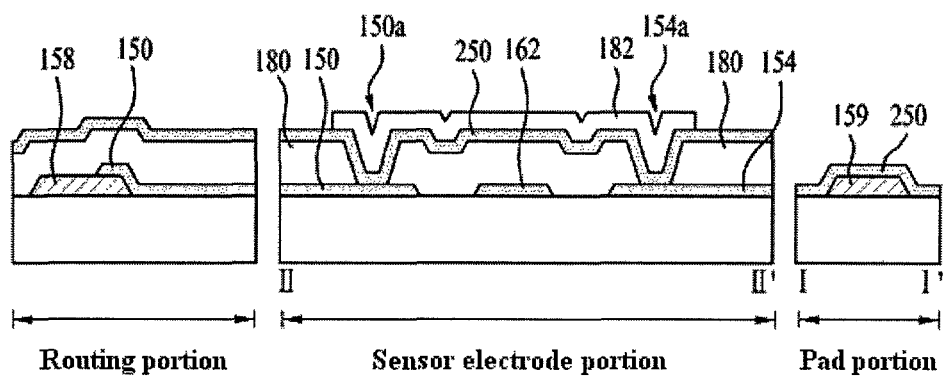

Then, referring to FIG. 8C, the second insulating layer 252 is patterned so that the second insulating layer 252 remains on a region that bridges 152 are to be formed thereon, by photolithography and dry etching with a fourth mask. According to this, the second insulating layer 182 is formed at regions the bridges 152 are to be formed thereon, while the second insulating layer is not formed at other regions.

Figure 8D:
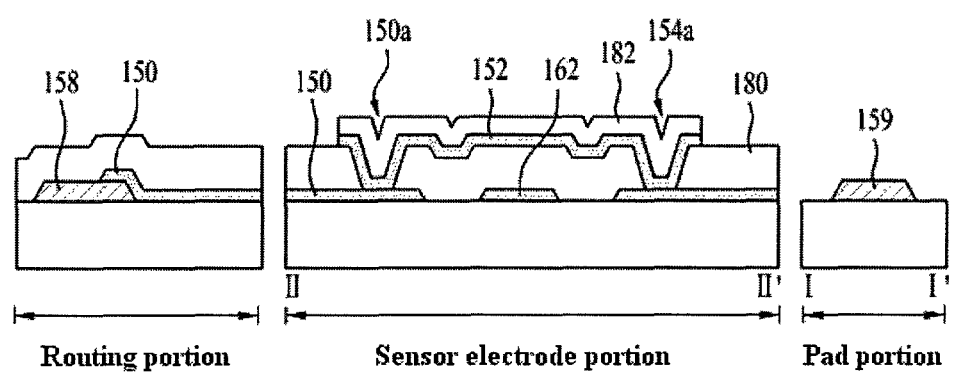

Then, referring to FIG. 8D, the third conductive layer 250 is patterned by wet etching with the fourth mask to form the bridges 152. Thus, since the second insulating layer 182 is patterned with the mask used for patterning the third conductive layer 250, the second insulating layer 182 is formed to have a pattern the same with the bridges 152, and since the second insulating layer 182 and the third conductive layer 250 are patterned except regions the bridges 152 are to be formed thereon with the fourth mask, enabling to remove the second insulating layer 182 and the third conductive layer 250 from the pad region at the same time, the second insulating layer 182 and the third conductive layer 250 may be removed from the pad region without an additional mask. That is, the patterning of the second insulating layer 182 and the third conductive layer 250 only with one mask permits to reduce a number of fabrication steps.

Figure 9:
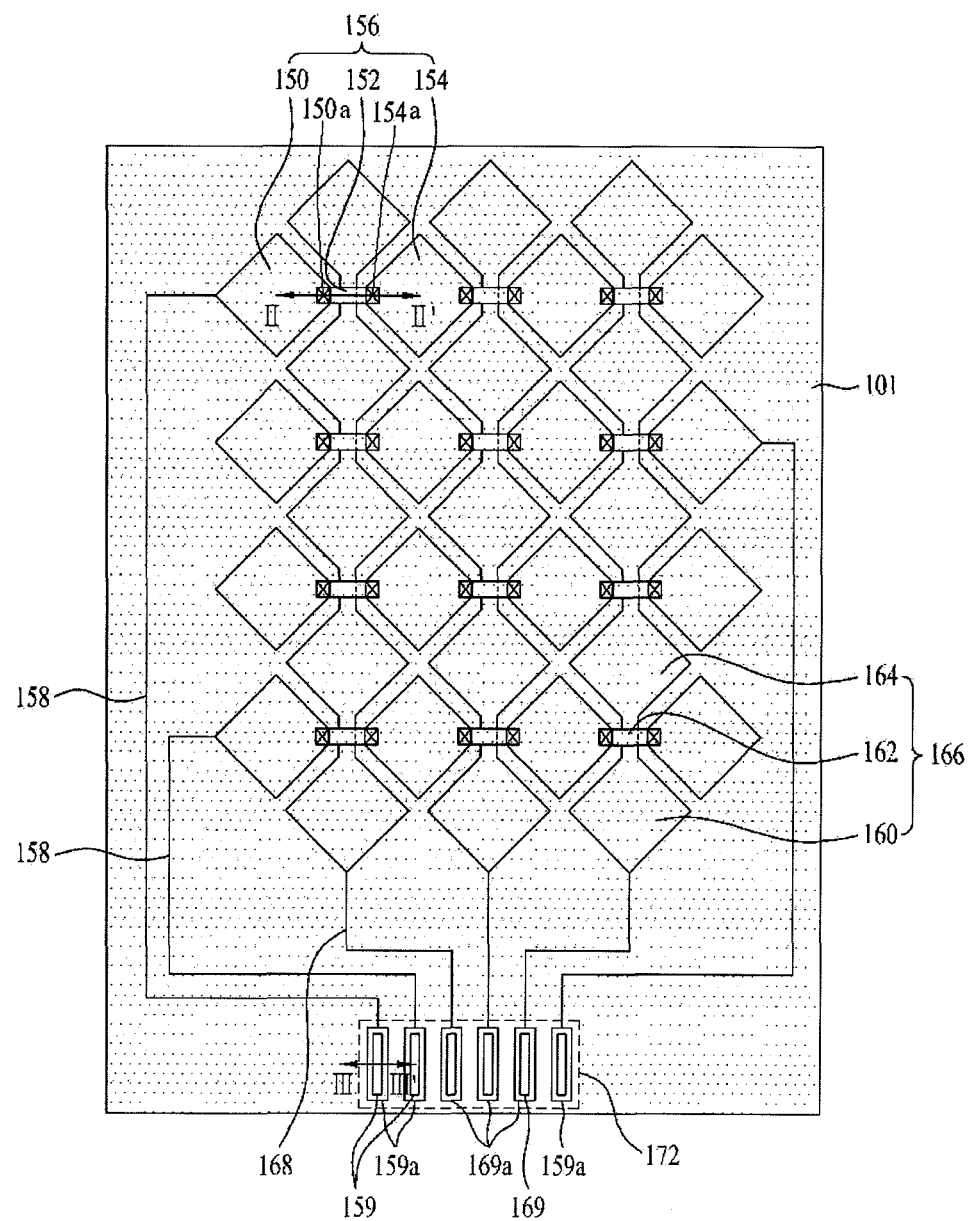
FIG. 9 illustrates a plan view of a touch panel in accordance with a second example embodiment of the invention.
Figure 10:
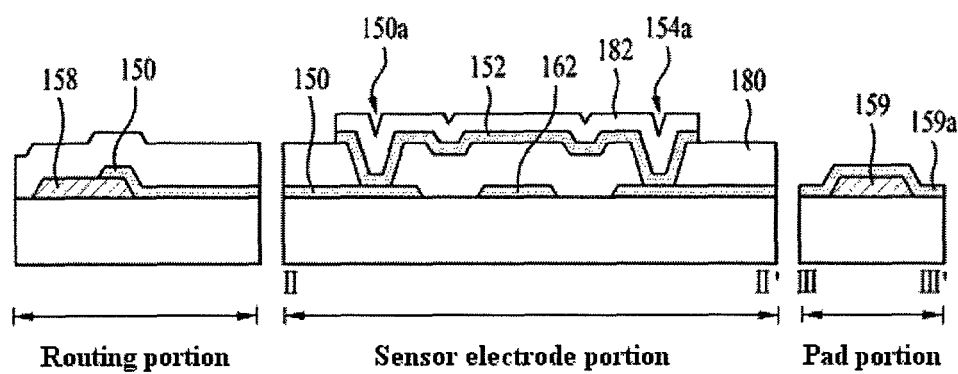
FIG. 10 illustrates sections across lines II-II' and III-III' of the touch panel in FIG. 9, respectively.

FIG. 9 illustrates a plan view of a touch panel in accordance with a second example embodiment of the invention, and FIG. 10 illustrate sections across lines II-II' and III-III' of the touch panel in FIG. 9, respectively.

The display device with an embedded touch panel in accordance with a second example embodiment of the invention includes a liquid crystal panel, and a touch panel mounted on the liquid crystal panel. In this instance, besides the liquid crystal panel, any flat display device may be utilized as the display device with an embedded touch panel.

Since the display device with an embedded touch panel in accordance with a second example embodiment of the invention is identical to the display device with an embedded touch panel in accordance with the first example embodiment of the invention except a pad portion of a sensor substrate, and a material of the first and second sensor electrodes, description of identical elements will be omitted. The second sensor electrodes 150 and 154 are formed of a crystalline transparent material on a substrate 101, and the bridge 152 is formed of an amorphous transparent material on the first insulating layer 180. The first sensor electrodes 160 and 164 and connection portions 162 are formed of a crystallized transparent material on the substrate 101.

The pad portion 172 includes a first pad electrodes 159 connected to the first routing line 158, a first transparent pad electrodes 159a connected to the first pad electrodes, second pad electrodes 169 connected to the second routing line 169, and a second transparent pad electrodes 169a connected to the second pad electrodes 169. The first transparent pad electrodes 159a are formed on the first pad electrodes 159 and connected to an FPC (Flexible Printed Circuit), and the second transparent pad electrodes 169a are formed on the second pad electrodes 169 and connected to the FPC. The first and second pad electrodes 159 and 169 are formed of the same metal, and on the same layer, with the first and second routing lines 158 and 168.

The first and second transparent pad electrodes 159a and 169a are formed of the crystallized transparent electrodes at the same time, and on the same layer, with the first and second sensor electrodes 150, 154, 160 and 164. Thus, since the first and second transparent pad electrodes 159a and 169a cover the first and second pad electrodes 159 and 169 respectively, corrosion or oxidation caused by oxygen contact may be prevented.

Figure 12:
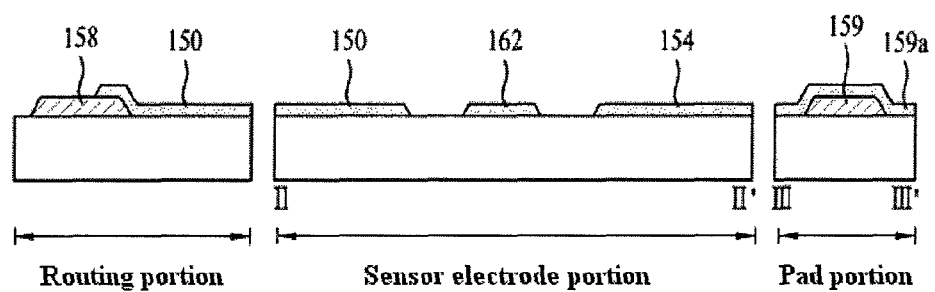
Figure 13:
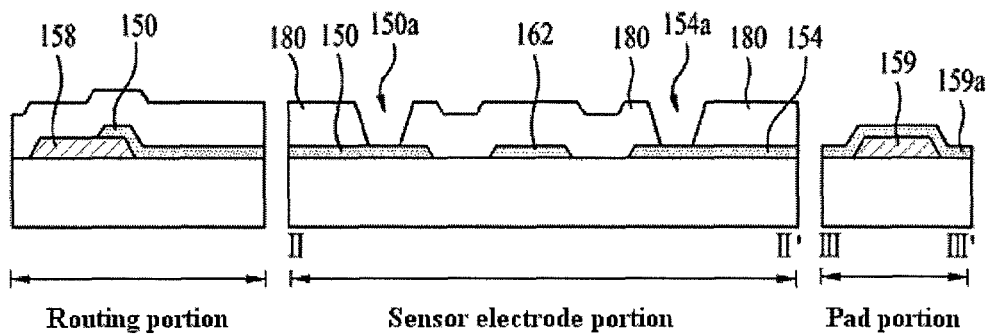
Figure 14:
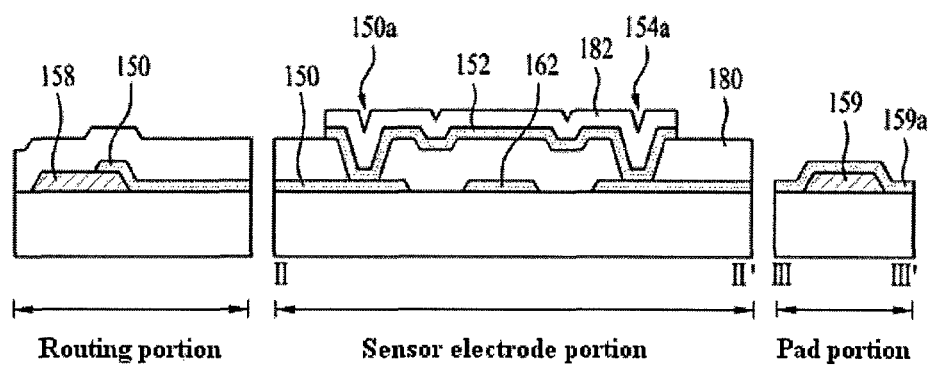

FIGS. 11 to 14 illustrate sections showing the steps of a method for fabricating a touch panel in accordance with a second example embodiment of the invention, and FIGS. 15A to 15D illustrate sections for describing the fourth mask step in FIG. 14, in more detail.

Figure 11:
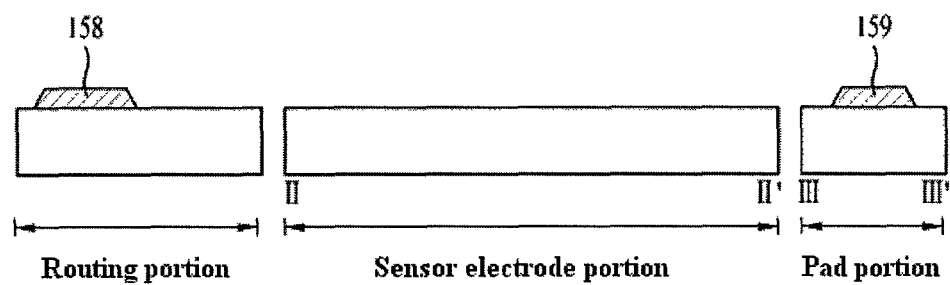
FIGS. 11 to 14 illustrate sectional views showing the steps of a method for fabricating a touch panel in accordance with a second example embodiment of the invention.

Referring to FIG. 11, a routing and pad pattern group is formed on a sensor substrate 101 to include first and second routing lines 158 and 168, and first and second pad electrodes 159 and 169 connected to the first and second routing lines 158 and 168.

In detail, a first conductive layer is subjected to patterning by photolithography and etching with a first mask to form a routing and pad pattern group on a sensor substrate 101 to include first and second routing lines 158 and 168, and a first pad electrodes 159 connected to the first routing line 158, and a second pad electrode 169 connected to a second routing line 168.

Referring to FIG. 12, a sensor electrode pattern group including first and second sensor electrodes 160, 164 and 150, 154, and connection portions 162 each connecting adjacent first sensor electrodes 160 and 164, and first and second transparent pad electrodes 159a and 169a are formed on the sensor substrate 101 having the routing and pad pattern group formed thereon.

In detail, a first transparent conductive layer is formed on the sensor substrate 101 including the first and second routing lines 158 and 168, and the first and second pad electrodes 159 and 169. Then, the first transparent conductive layer on the sensor substrate 101 is crystallized with a laser beam or by heating in an oven. The first transparent conductive layer is patterned by photolithography and etching with a second mask to form a sensor electrode pattern group including first sensor electrodes 160 and 164 in a first direction, second sensor electrodes 150 and 154 in a second direction, connection portions 162 each connecting adjacent first sensor electrodes 160 and 164, a first transparent pad electrode 159a on the first pad electrode 159, and a second transparent pad electrode 169a on the second pad electrode 169.

Referring to FIG. 13, a first insulating layer 180 is formed on the sensor substrate 101 having the sensor electrode pattern group, and first and second transparent pad electrodes 159a and 169a formed thereon to include contact holes 150a and 154a, and the first insluting layer 180 is removed to open a pad portion region having the first and second transparent pad electrodes 159a and 169a formed thereon.

Referring to FIG. 14, bridges 152 and a second insulating layer 182 are formed on the sensor substrate 101 having the first insulating layer 180 with the contact holes 150a and 154a formed thereon. This will be described with reference to FIGS. 15A to 15D, in detail.

Figure 15A:
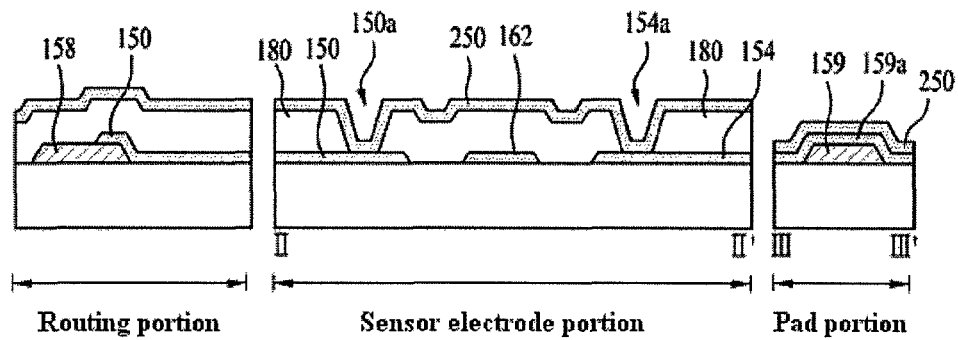
FIGS. 15A to 15D illustrate sections for describing the fourth mask step in FIG. 14, in more detail.
Figure 15B:
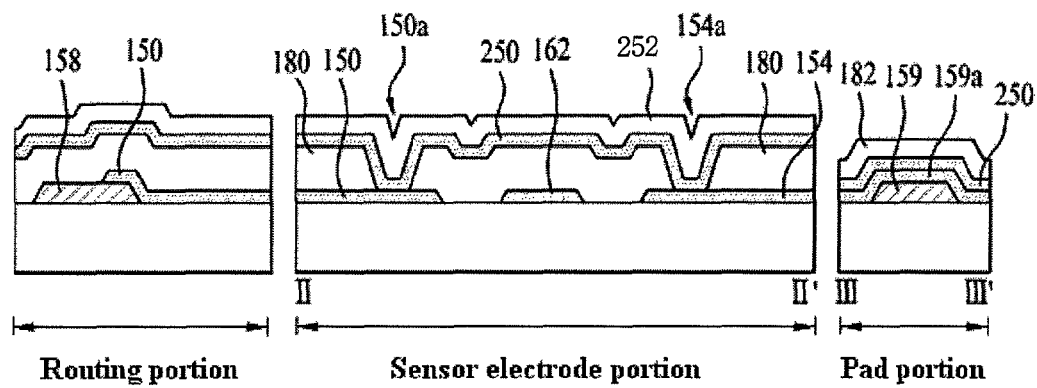
Figure 15C:
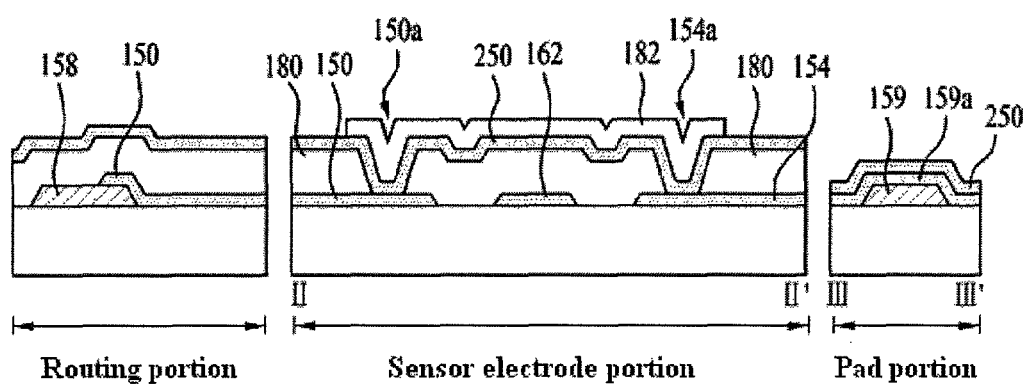

Referring to FIG. 15A, a second transparent conductive layer 250 of an amorphous transparent layer is formed on the sensor substrate 101 having the first insulating layer 180 formed thereon by deposition, such as sputtering, and, as shown in FIG. 15B, a second insulating layer 252 of an inorganic insulating material, such as $SiO_2$, is coated on an entire surface of the second transparent conductive layer 250. Then, as shown in FIG. 15C, the second insulating layer 252 is patterned by photolithography and etching with a fourth mask except a region that the bridges 152 are to be formed thereon. According to this, the second insulating layer 182 is formed only at the region that the bridges 152 are to be formed thereon, and no second insulating layer 182 is formed on other regions.

Figure 15D:
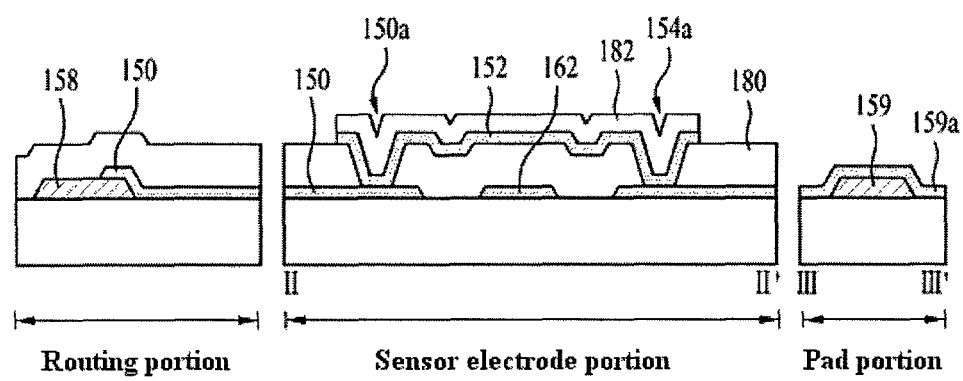

Then, referring to FIG. 15D, the second transparent conductive layer 250 is patterned by wet etching with the fourth mask, to form the bridges 152 and to leave the first and second transparent pad electrodes 159a and 169a at the pad portion region only. In this instance, the first and second transparent pad electrodes 159a and 169a are not etched, but left remaining at the pad portion region. This is because only the second transparent conductive layer 250 can be etched owing to a difference of etch rates between the crystallized transparent pad electrode and the amorphous second transparent conductive layer. Since the etch rate of the amorphous second transparent conductive layer is higher than the etch rate of the crystallized transparent pad electrode, the amorphous second transparent conductive layer is etched in the etching while the crystallized transparent pad electrode is, not etched, but maintained at an original state. According to this, the second transparent conductive layer 250 of the amorphous second transparent layer is etched, while the crystallized first and second transparent pad electrodes 150a and 169a are left remaining.

As have been described, the display device with an embedded touch panel and a method for fabricating the same of the invention has the following advantages. After patterning the third conductive layer 250 to form the bridges, the third conductive layer is crystallized by a laser or by heating in an oven.

The formation of the bridges and the second insulating layer with the same mask and in the same step by patterning permits to reduce a number of masks, thereby reducing a number of steps.

The invisible bridges of a transparent material improve a display quality, and the second insulating layer formed on the bridges prevents the bridges from scratches and static electricity.

It will be apparent to those skilled in the art that various modifications and variations can be made in the invention without departing from the spirit or scope of the inventions. Thus, it is intended that the invention covers the modifications and variations of this invention provided they come within the scope of the appended claims and their equivalents.

What is claimed is:

1. A method for fabricating a touch panel, comprising:
    forming a routing and pad pattern group on a substrate to include first and second routing lines, first pad electrodes connected to the first routing line, and second pad electrodes connected to the second routing line, by using a first mask;
    forming a sensor electrode pattern group on the substrate having the routing and pad pattern group formed thereon to include first sensor electrodes formed in a first direction, second sensor electrodes formed in a second direction, and connection portions that each connects adjacent first sensor electrodes, by using a second mask;
    forming a first insulating layer to include contact holes to expose portions of the second sensor electrodes, by using a third mask; and
    forming both bridges that each connects adjacent second sensor electrodes through the contact holes and a second insulating layer on the bridges, by using a fourth mask, wherein the forming both bridges and the second insulating layer on the bridges includes forming the second insulating layer only on a top surface and not on a side surface of the bridges.

2. The method as claimed in claim 1, wherein the step of forming a first insulating layer includes removing the first insulating layer from a pad portion region to open the pad portion region having the first and second pad electrodes formed thereon.

3. The method as claimed in claim 1, wherein the step of forming a sensor electrode pattern group includes:
    forming a first transparent conductive layer on the substrate including the first and second routing lines, and the first and second pad electrodes;
    crystallizing the first transparent conductive layer; and
    patterning the first transparent conductive layer to form the first sensor electrodes, the second sensor electrodes, and the connection portions.

4. The method as claimed in claim 3, wherein the patterning of the first transparent conductive layer further comprises forming a first transparent pad electrode on the first pad electrode, and a second transparent pad electrode on the second pad electrode.

5. The method as claimed in claim 1, wherein the step of forming both bridges and a second insulating layer on the bridges includes:
    forming a second transparent conductive layer on the first insulating layer;
    forming the second insulating layer on the second transparent conductive layer; and
    patterning the second insulating layer and the second transparent conductive layer by using the fourth mask to form the bridges.

6. The method as claimed in claim 5, wherein the step of patterning includes:
    selectively removing the second insulating layer by photolithography and dry etching with the fourth mask except a region where the bridges are to be formed thereon; and
    patterning the second transparent conductive layer by wet etching by using the fourth mask to form the bridges.

7. The method as claimed in claim 6, wherein the second transparent conductive layer is an amorphous layer.

8. The method as claimed in claim 7, further comprising crystallizing the bridges after the patterning of the second transparent conductive layer.

\* \* \* \* \*